US008184364B2

(12) United States Patent
Xu et al.

(10) Patent No.: US 8,184,364 B2
(45) Date of Patent: May 22, 2012

(54) ILLUMINATOR FOR A 3-D OPTICAL MICROSCOPE

(75) Inventors: James Jianguo Xu, San Jose, CA (US); Ken Kinsun Lee, Los Altos Hills, CA (US)

(73) Assignee: Zeta Instruments, Inc., San Jose, CA (US)

( * ) Notice: Subject to any disclaimer, the term of this patent is extended or adjusted under 35 U.S.C. 154(b) by 678 days.

(21) Appl. No.: 12/147,478

(22) Filed: Jun. 27, 2008

(65) Prior Publication Data

US 2008/0291533 A1    Nov. 27, 2008

Related U.S. Application Data

(63) Continuation-in-part of application No. 11/754,282, filed on May 26, 2007, now Pat. No. 7,729,049.

(51) Int. Cl.
*G02B 21/00* (2006.01)
(52) U.S. Cl. .................................. 359/368; 359/389
(58) Field of Classification Search .................. None
See application file for complete search history.

(56) References Cited

U.S. PATENT DOCUMENTS

| | | | |
|---|---|---|---|
| 2,977,847 A * | 4/1961 | Meyer-Arendt | 359/370 |
| 3,437,395 A * | 4/1969 | Rosenberger et al. | 359/363 |
| 4,198,571 A | 4/1980 | Sheppard | |
| 4,629,324 A | 12/1986 | Stern | |
| 4,692,051 A | 9/1987 | Stansbury, Jr. et al. | |
| 4,852,985 A * | 8/1989 | Fujihara et al. | 359/387 |
| 4,995,716 A | 2/1991 | Warnicki et al. | |
| 5,022,743 A | 6/1991 | Kino | |
| 5,151,609 A | 9/1992 | Nakagawa | |
| 5,381,236 A | 1/1995 | Morgan | |
| 6,088,155 A * | 7/2000 | Tandler et al. | 359/381 |
| 6,275,335 B1 | 8/2001 | Costales | |
| 6,376,818 B1 | 4/2002 | Wilson et al. | |
| 6,616,291 B1 * | 9/2003 | Love | 362/101 |
| 7,729,049 B2 | 6/2010 | Xu et al. | |
| 2004/0257360 A1 | 12/2004 | Sieckmann | |
| 2006/0007533 A1 | 1/2006 | Eichhorn et al. | |
| 2006/0038144 A1 | 2/2006 | Maddison | |
| 2007/0109633 A1* | 5/2007 | Stelzer | 359/385 |
| 2007/0171519 A1* | 7/2007 | Wolleschensky | 359/385 |
| 2010/0134595 A1 | 6/2010 | Xu et al. | |
| 2010/0135573 A1 | 6/2010 | Xu et al. | |

OTHER PUBLICATIONS

Cole et al. "Time-domain whole-field fluorescence lifetime imaging with optical sectioning", Journal of Microscopy, vol. 203, Pt. 3, Sep. 2001, pp. 246-257.

* cited by examiner

*Primary Examiner* — Lee Fineman
(74) *Attorney, Agent, or Firm* — Bever, Hoffman & Harms, LLP; Jeanette S. Harms

(57) ABSTRACT

A compact and low cost microscope illuminator capable of generating 3-D optical images includes a first light source and a second light source. The two light sources lead two optical paths: one to illuminate a sample and another to project a pattern onto the focal plane of a microscope objective lens. The two light sources are controlled by a processor and can be turned on and off rapidly. A 3-D optical microscope equipped with said microscope illuminator and a method of creating a 3-D image on said 3-D optical microscope are also described.

5 Claims, 13 Drawing Sheets

ILLUMINATOR FOR A 3-D OPTICAL MICROSCOPE

RELATED APPLICATIONS

This application is a continuation-in-part of U.S. patent application Ser. No. 11/754,282 filed on May 26, 2007 now U.S Pat No. 7,729,049, which is incorporated by reference herein in its entirety.

FIELD OF THE INVENTION

This invention relates generally to an optical microscope and, more particularly, to a microscope illuminator for a three-dimensional (3-D) imaging optical microscope.

BACKGROUND OF THE INVENTION

A conventional microscope enables an operator to view magnified images of minute features on a sample otherwise invisible to the human eye. Because of this, conventional microscopes have been widely used in universities, in research institutes, and in many industries. A conventional microscope, however, has important limitations. For example, it only provides a two-dimensional (2-D) image of a sample while in the real world a majority of samples are 3-D in nature.

Various improvements have been made over the years to achieve 3-D viewing and 3-D imaging with optical microscopes. Costales in U.S. Pat. No. 6,275,335 discloses a stereomicroscope using various polarizing optical components to achieve a stereoscopic effect in the image. Although Costales' microscope produces a perception of depth, it cannot provide quantitative measurement of the depth dimension.

Kino in U.S. Pat. No. 5,022,743 proposes a confocal microscope utilizing a spinning Nipkow disc. Sheppard in U.S. Pat. No. 4,198,571 discloses a confocal microscope based on laser scanning. Although a confocal microscope is able to generate a 3-D image and provide quantitative depth measurement, it is expensive to build and relatively complex to maintain and operate. In addition, if one already bought a conventional microscope, it is not easy and in many cases impossible to turn his microscope into a confocal microscope.

Sieckmann in U.S. Appl. No. 2004/0257360A1 proposes a method of creating 3-D images of a sample by analyzing a stack of images of the sample taken at various focus positions. Although it is cost effective to implement such a method, it only works on samples with contrasting features. In short, Sieckmann's method fails to generate a reliable and accurate 3-D image of a sample with little or no contrast.

Morgan in U.S. Pat. No. 5,381,236 proposes an optical range sensor that is capable of sensing the depth profile of a plain surface by actively projecting a pattern of light onto the target object. Although Morgan's sensor measures the 3-D profile of a sample, it does not combine the 3-D profile with the intensity or color information of the sample. As a result, his sensor does not yield a 3-D image. In addition, the pattern of light in Morgan's sensor is always superimposed on the sample surface, and thus interferes with the true features of the sample surface being captured by a camera.

Accordingly, there is a need for a 3-D optical microscope that is relatively low cost to build and easy to operate; a method that can be easily deployed to turn a conventional microscope into a 3-D optical microscope; and a 3-D imaging method that works on all samples regardless of their feature contrast.

SUMMARY OF THE INVENTION

The need is met with the present invention which achieves three objectives: first, to create a simple and relatively low cost microscope that is capable of generating a 3-D image on samples with or without contrast; second, to propose simple hardware modifications that one can make to turn a conventional optical microscope into a 3-D optical microscope; and third, to disclose a method that enables reliable and accurate 3-D imaging on almost any sample regardless of its image contrast.

In one aspect of the present invention, a compact and low cost microscope illuminator capable of generating 3-D optical images includes a first light source and a second light source. The two light sources lead two optical paths: one to illuminate a sample and another to project a pattern onto the focal plane of a microscope objective lens. The two light sources are controlled by a processor and can be turned on and off rapidly.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1A:
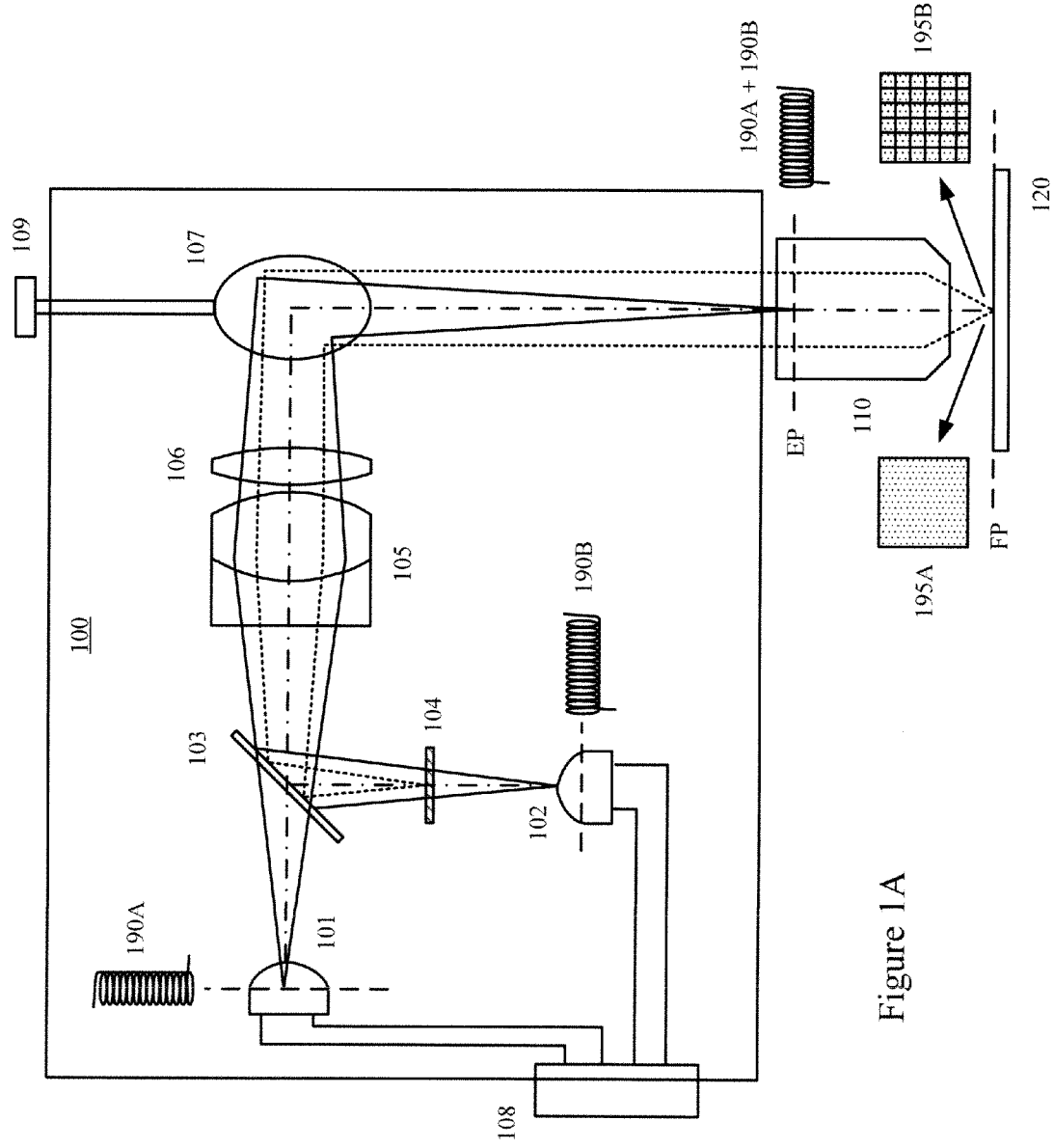
FIG. 1A is a top view block diagram illustrating a microscope illuminator of the present invention.

FIG. 1A is a top view block diagram illustrating a microscope illuminator of the present invention. The microscope illuminator 100 contains two light sources 101 and 102 forming two light paths as illustrated by the dot-dashed lines. Light source 101 launches a first light path. The first part of the first light path consists of light source 101. The second part of the first light path consists of a first beam-splitter 103, a lens group formed by an achromat doublet lens 105 and a double-convex lens 106, and a second beam-splitter 107. Light source 102 launches a second light path. The first part of the second light path consists of light source 102 and a patterned article 104. The second part of the second light path consists of a first beam-splitter 103, a lens group formed by an achromat doublet lens 105 and a double-convex lens 106, and a second beam-splitter 107. Although the first parts of their paths are different, the first and second light paths share the same second part of their paths. Beam-splitter 107 is mounted on a linear slider linked to a pull lever 109. If necessary, pull lever 109 can slide beam-splitter 107 sideways so that it is outside the shared optical path of illuminator 100. The optical components of illuminator 100 are mounted inside a dark enclosure with two openings (not shown): a top opening and a bottom opening. The top opening is directly above beam-splitter 107 while the bottom opening directly below beam-splitter 107. These two openings allow light from both light paths to interact with the outside world. A multi-pin connector 108 is linked to light sources 101 and 102 via electrical wires.

In the preferred embodiment, light sources 101 and 102 are light emitting diodes or LEDs. Other light sources such as halogen lamps, fiber coupled lights, lasers, and etc can also be used and are within the scope of this invention. Lens 105 is an achromat doublet lens. Lens 106 is a double-convex lens. It is understood by those skilled in the art that other types of lenses can also be used and are within the scope of this invention. The patterned article is a piece of glass with a two dimensional array of evenly spaced opaque dots formed on one of its surfaces. Different types of patterns such as a grid and etc. can also be used. In fact, any pattern will work as long as it satisfy the following conditions: (1) it has high contrast; (2) it is either regular or random but evenly distributed; (3) it is semi-transparent; (4) its minimum feature size matches sampling resolution of an imaging optical sensor used. In addition, different substrate materials such as a photographic film and etc. can also be used to carry the pattern. These various designs of a patterned article are also within the scope of this invention. The patterned surface of the patterned article is located at the effective focal plane of said lens group consists of lenses 105 and 106.

Figure 1B:
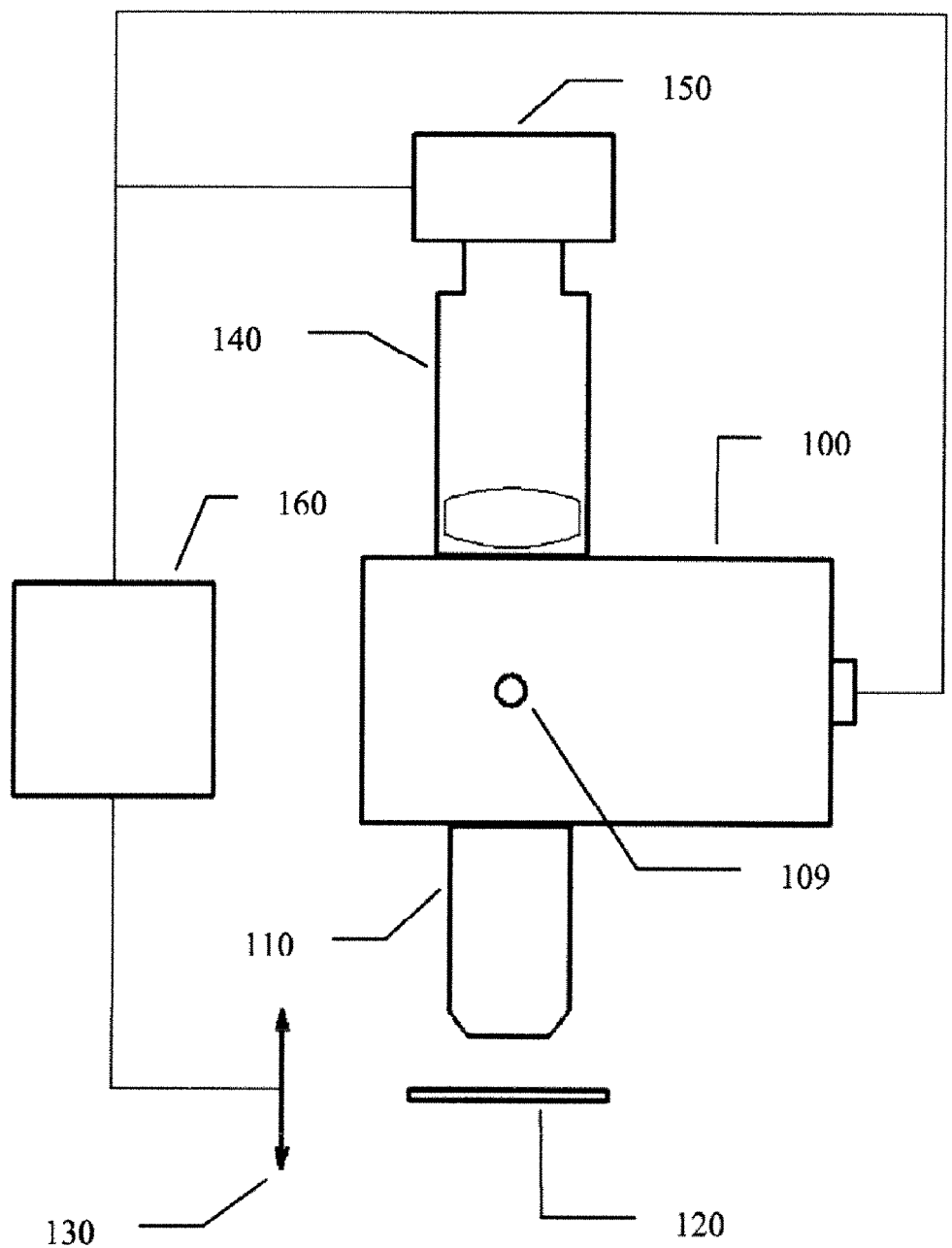
FIG. 1B is a block diagram illustrating a reflective 3-D optical microscope of the present invention.

FIG. 1B is a diagram illustrating a reflective 3-D optical microscope equipped with illuminator 100 in accordance with the present invention. Illuminator 100 is shown in side view. To avoid confusion, the optical components inside illuminator 100 are not shown in FIG. 1B. Whenever these components are mentioned in the next several paragraphs, the reader is advised to reference FIG. 1A. A microscope operating in reflective illumination mode is often used for studying opaque samples such as a semiconductor wafer. When operating in reflective mode, a microscope objective lens 110 is mounted directly below the bottom opening of illuminator 100. When light source 101 or 102 is turned on, the lens group formed by lenses 105 and 106 projects an image of the light source (e.g. light sources 190A and 190B) onto the entrance pupil (EP) of microscope objective lens 110 (via the solid line ray tracing), thereby ensuring uniform illumination (e.g. 195A (with 190A) or 195B (with 190B)) on sample 120 (having a dot pattern for illustration purposes). When light source 102 is turned on, the lens group formed by lenses 105 and 106 in conjunction with objective lens 110 projects an image of the pattern on patterned article 104 onto the focal plane (FP) of objective lens 110 (via the dotted line ray tracing). Positioning means 130 is provided to change the relative position between sample 120 and objective lens 110. As a result, different features on the sample can be brought into focus of objective lens 110. As an option, a XY stage (not shown) can be incorporated into the microscope of FIG. 1B to move sample 120 around in a horizontal plane. In the preferred embodiment, positioning means 130 is a motorized Z stage. There are, of course, other ways to vary the relative position between sample 120 and objective lens 110. For example, objective lens 110 could be mounted on a piezo-electric actuator. In such an arrangement, sample 120 remains stationary while objective lens 110 moves up and down. It is understood by those skilled in the art that these variations are within the scope of this invention. Coupler 140 in conjunction with objective lens 110 yields an image of sample 120 on optical sensor 150. In the preferred embodiment, optical sensor 150 is either a CCD or a CMOS camera.

Processor 160 is connected to the 3-D optical microscope of FIG. 1B. Said processor is used to control positioning means 130, light sources 101 and 102 of FIG. 1A, and optical sensor 150. In addition, said processor analyzes data and creates a 3-D image of the sample. In the preferred embodiment, said process is a personal computer.

Creating a 3-D image on the 3-D optical microscope of FIG. 1B involves just a single pass according to the present invention. During the process, positioning means 130 moves sample 120 from a pre-determined start position away from objective lens 110 through a set of pre-determined steps. At each step, processor 160 turns light source 102 on and light source 101 off. As a result, an image of the pattern on patterned article 104 is projected onto the focal plane of objective lens 110, optical sensor 150 captures and saves a first image of the sample; then processor 160 turns light source 101 on and light source 102 off, optical sensor 150 captures and saves a second image of the sample. This process repeats itself until all the steps have been taken. When done, processor 160 analyzes the first and second image set to create a 3-D image. The details of the single pass 3-D image creation process of the present invention will be discussed when we describe FIGS. 5 and 6 later. In the next several paragraphs, we will discuss software controls and algorithms related to acquiring 2-D image stacks of a sample, extracting image contrast, constructing 3-D depth profiles, and creating a 3-D rendering of the sample.

A microscope objective lens is usually characterized by several important parameters such as focal length, magnification, working distance (W.D.), and numerical aperture (N.A.). To a large extent, the N.A. of an objective lens determines its depth-of-field. When a sample is placed at the focal plane of an objective lens, the sample is said to be in-focus, and the image produced by the objective lens has the sharpest contrast. If the same sample is placed slightly away from the focal plane but is still within the range defined by the depth-of-field, the image contrast is still relatively sharp. As the sample is moved out of the depth-of-field range, it becomes out-of-focus, and the image becomes blurrier.

Mathematically, image contrast is related to the high frequency or gradient content of the image intensity: the sharper the image, the higher the intensity gradient, and the stronger its high frequency content. Consider a microscope operator who is trying to find the best focus. He will move the sample up and down around the focal plane of the objective lens to find the point where the image contrast is the highest. Similarly, a system can be devised so that the relative position between the sample and the objective lens is changed at controlled steps. After each step move, a camera takes an image; the image is converted into digital form so a computer can extract its high frequency content. This high frequency content is recorded and compared with that of the previous steps. As the sample is stepping one-way towards and eventually passing through the best focus, its image's high frequency content level would rise, reach a peak, and then fall. The best focus position corresponds to where the image's high frequency content reaches a maximum.

Generally, an object is not flat but rather has a depth profile. By calculating the high frequency contents at each pixel for every image taken at a specific distance between the sample and the objective lens, the computer can compare and find the distance where maximum high frequency content of each pixel occurs. By applying this calculation to all pixels, the process can, in theory, yield a depth profile of the sample. The intensity or color values of those pixels that are located on the contour of the depth profile can also be extracted from the relevant images. Graphic rendering of both depth and color information should yield a 3-D image of the sample. This type of image contrast based 3-D creation method forms the bases of Sieckmann in U.S. Appl. No. 2004/0257360A1.

There are many well-known methods in calculating the high frequency content of a pixel. Most of these methods are based on finding the intensity differences among neighboring pixels, and are called high pass filters, or gradient filters. Most commonly, the operation of these filters is a convolution of a filter mask with the pixel and its immediate 8 neighboring pixels:

| Filter mask, Laplacian | | | Neighboring pixels | | |
|---|---|---|---|---|---|
| −1 | −1 | −1 | P(−1, −1) | P(0, −1) | P(1, −1) |
| −1 | 8 | −1 | P(−1, 0) | P(0, 0) | P(1, 0) |
| −1 | −1 | −1 | P(−1, 1) | P(0, 1) | P(1, 1) |

Where P(i,j) is the intensity of a pixel located (i,j) pixels away from the reference pixel or pixel of interest, and i being the relative pixel number in the horizontal (X) direction, and j being that in the vertical (Y) direction. For example, if P(0, 0) is the intensity of the pixel of interest, then P(−1,−1) refers to that of its top left neighboring pixel, P(0,−1) that of its top neighbor, and P(1,−1) that of its top right neighbor. Using the Laplacian high pass filter to find the high frequency content of P(0, 0) involves convolving the Laplacian filter mask with the neighboring pixels:

High frequency content of $P(0,0)$=absolute($8*P(0,0)$−

$1*P(-1,-1)-1*P(0,-1)-1*P(1,-1)-$ $1*P(-1,0)-1*P(1,0)-$ $1*P(-1,1)-1*P(0,1)-1*P(1,1))$     Equation 1

A high pass filter, like the Laplacian, is non-directional in that it does not care whether or not an image has directional features. There are directional high pass or edge filters that have filter masks optimized to the direction of interest. For example, if an image is known to have horizontal edges or lines, and if only the vertical component of the high frequency content is wanted, then the North-South edge filter mask can be used to produce a much stronger result than one can get by using a non-directional filter mask.

| North-South directional filter mask: | | |
|---|---|---|
| −1 | −1 | −1 |
| −0 | 0 | 0 |
| 1 | 1 | 1 |

Since most images do not have a fixed feature orientation, a single directional filter operation will in general not yield desirable results. Instead, multiply applications of directional filters such as the ones shown below, each with a different direction, are performed to find the gradients along these directions. Among them, the one filter that yields maximum value determines the maximum high frequency content of a pixel. Such an approach is called maximum gradient method.

| North-South mask: | | | East-West mask: | | | 135 deg mask: | | | 45 deg mask: | | |
|---|---|---|---|---|---|---|---|---|---|---|---|
| −1 | −1 | −1 | 1 | 0 | −1 | −1 | −1 | 0 | 0 | −1 | −1 |
| 0 | 0 | 0 | 1 | 0 | −1 | −1 | 0 | 1 | 1 | 0 | −1 |
| 1 | 1 | 1 | 1 | 0 | −1 | 0 | 1 | 1 | 1 | 1 | 0 |

A three-by-three filter mask is commonly used because of its small size, thus computational efficient, and because it captures only the highest frequency content. Other directional 3×3 edge filter masks are also possible. For example, the Sobel edge filter mask, shown below, will yield similar results.

| Sobel North-South mask: | | |
|---|---|---|
| 1 | 2 | 1 |
| 0 | 0 | 0 |
| −1 | −2 | −1 |

A larger filter mask, 5×5 or 7×7 for example, also works. In particular, a larger filter mask can be tailored to work better for images with lower contrast, or with more lower frequency contents, at the expense of computation efficiency. It is understood that other filter masks that can be used to extract contrast information is within the scope of the present invention.

Figure 2:
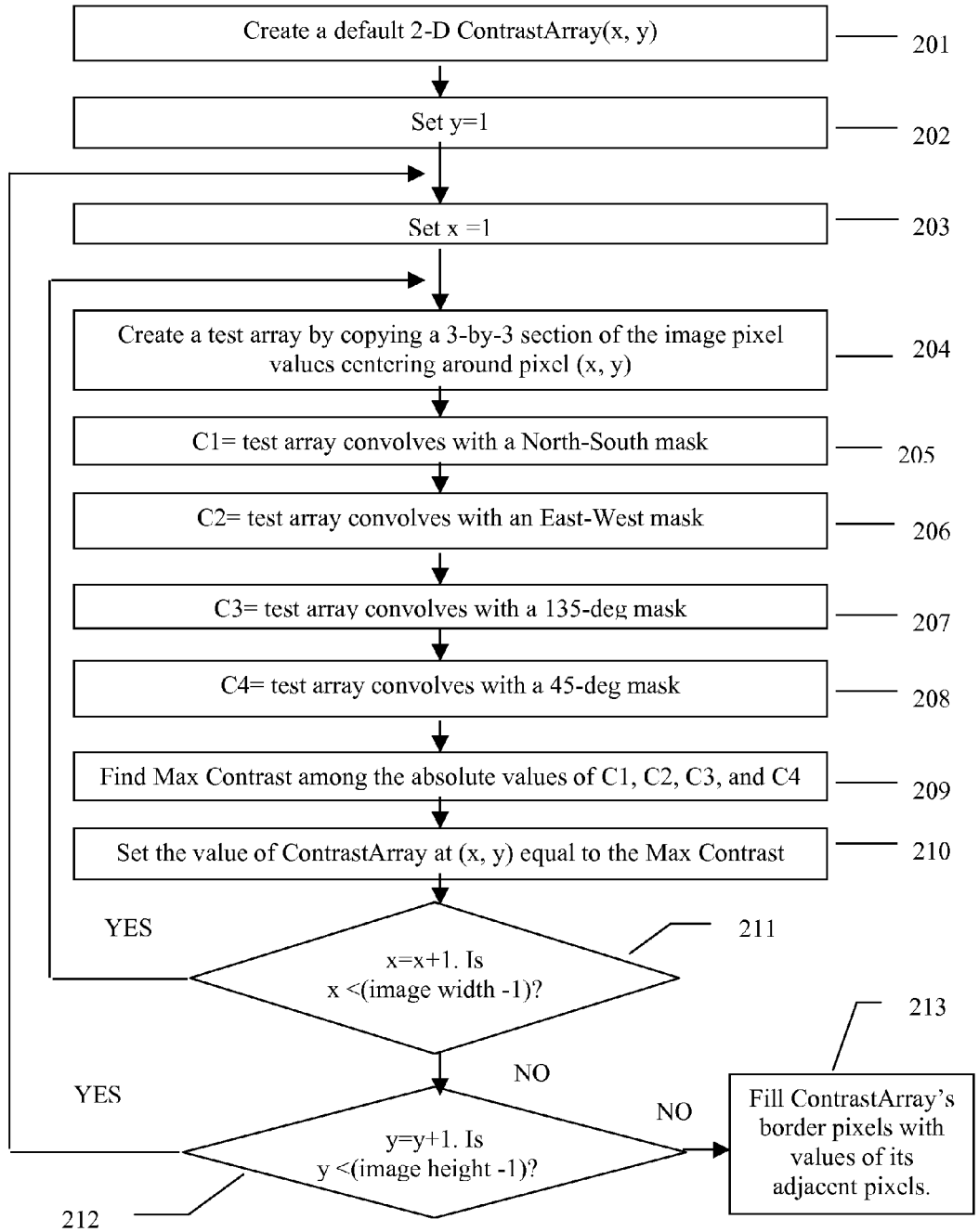
FIG. 2 is a flowchart illustrating a process of extracting a 2-D contrast array from a 2-D image using maximum gradient method.

A process of extracting a 2-D contrast array from a 2-D image based on maximum gradient method is illustrated in FIG. 2. In step 201, a default 2-D ContrastArray(x, y) is created, where all pixel are either left un-initialized or set to a default value. In steps 202 and 203, the initial pixel location is set to (x=1, y=1). In step 204, a test array is created by copying the intensity values of a 3-by-3 section of the image pixels centering around pixel (1, 1). Convolving this test array with a North-South mask in a manner similar to Equation 1 yields a value C1 in step 205. Subsequently, convolving the same test array with an East-West, 135-deg, and 45-deg masks yield values C2, C3, and C4 respectively in steps 206-208. In step 209, a comparison is made among C1, C2, C3, and C4 to find the maximum absolute value. In step 210, the maximum contrast for pixel (1, 1), ContrastArray(1, 1), is set to equal to the maximum value found in step 209. Next, we move one pixel over in the horizontal direction, that is, our next pixel is (2, 1). Since x=2, x is less than (image width−1), test 211 returns YES and the process flow is looped back to 204. This loop will run its course until x≧(image width−1). At that point, the flow proceeds to step 212 where we start to increment y pixel number from 1 to 2, and the process is moved back to step 203, and x is set to 1. Again the loop will run its course until y≧(image height−1) and test 212 returns NO. At that moment we have filled in the entire ContrastArray(x, y) except for the border pixels. We simply fill ContrastArray corresponding to the border pixels with the values of their adjacent pixels in step 213. We now have finished generating a 2-D contrast array from a 2-D image.

Figure 3:
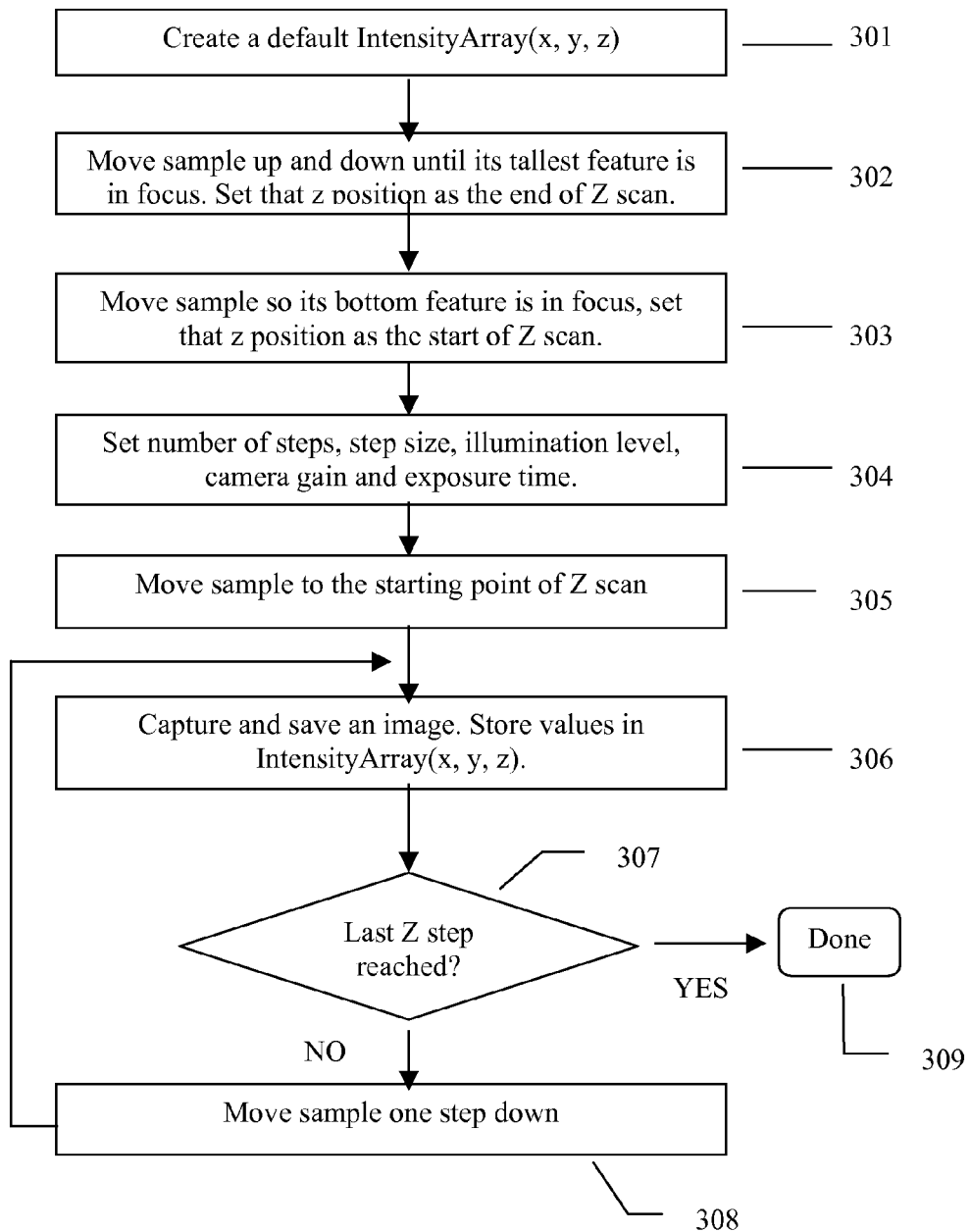
FIG. 3 is a flowchart illustrating a process of performing a Z scan and image capture.

To create a 3-D depth profile of a sample based on contrast analysis method, a stack of images must be taken at different focus positions or relative sample-objective lens z distances. The detailed image capturing process is illustrated in FIG. 3. The process starts with step 301, the creation of a default IntensityArray(x, y, z) where all pixels are either left un-initialized or set to a default value. At this point, a user must determine the range of z distances in order to cover the tallest peak and the deepest valley on the sample. This is done in steps 302 and 303. In step 304, the user also needs to specify the number of steps, so the computer can calculate the Z step size needed to cover the entire z distance range. Alternatively, he can specify step size, and the computer determines the number of steps to cover the z range. The user must also choose the right amount of illumination and select appropriate gain and exposure time for the camera so that an image captured by the camera is neither too bright nor too dark. Of course, once all of these settings are fine tuned, they can be stored in a recipe to be used later by the computer on similar samples. After choosing all the settings, the sample is moved to the starting Z scan position in step 305. In step 306, the camera captures an image in digital form. The intensity values of every pixel of the image and the corresponding z distance value is stored into IntensityArray(x, y, z). At that point, the flow proceeds to check point 307 to see if the last Z scan step is reached. If not, the sample is moved down one step, at 308, and the process is directed back to step 306. This loop will run its course until the last Z scan step is reached. The process of FIG. 3 is called Z scan and image capture.

Since the working distance of a high magnification objective lens is usually very small, some precaution is needed to prevent the objective lens from coming into contact with the sample during the Z scan. Generally speaking, it is safer to start the Z scan from a position where the sample is closest to the objective lens within the Z scan range, and gradually move the sample away from the objective lens. In the case of FIG. 3, this means to start the scan from the bottom of the sample, and move the sample down to cover the full Z scan range. As mentioned earlier, there are alternative ways to carry out the Z scan other than moving the sample. For example, it is possible to move the objective lens up and down to achieve the same result as stepping the sample. If the approach is moving the objective lens, it is safer to start the Z scan from the bottom of the sample, and then gradually step the objective lens upward to cover the full Z scan range.

Figure 4:
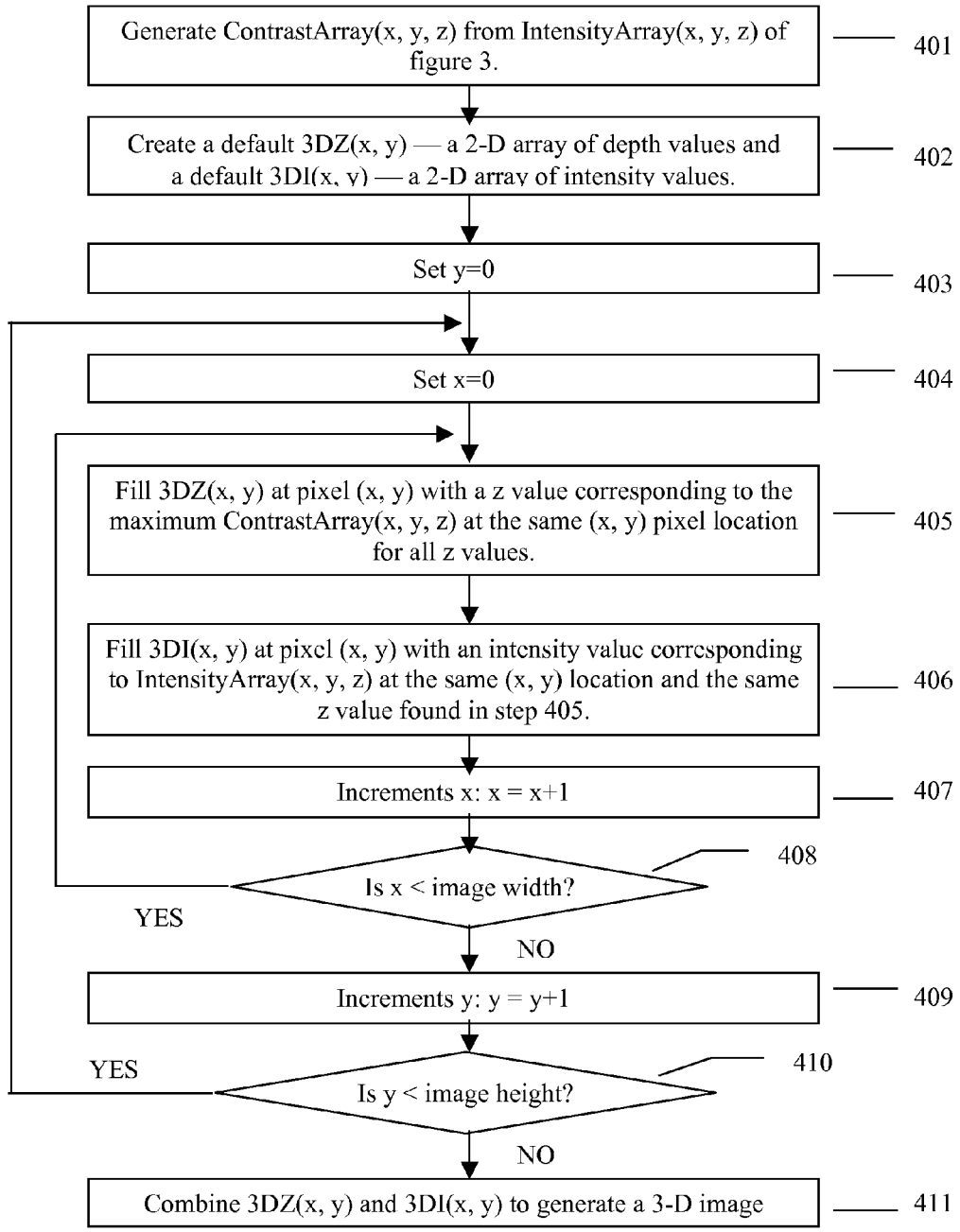
FIG. 4 is a flowchart illustrating a process of generating a 3-D image based on image contrast.

Once a stack of images is captured through the Z scan process of FIG. 3, a 3-D image of the sample can be constructed using a process outlined in FIG. 4. The process starts with step 401, the creation of a high contrast array ContrastArray(x, y, z). For every z step, the corresponding values of ContrastArray(x, y, z) is calculated based on the maximum gradient method of FIG. 2 using the image data stored in IntensityArray(x, y, z) of FIG. 3. The next step, 402, is to create a default array 3DZ(x, y) to store depth value and a default array 3DI(x, y) to store intensity value. In steps 403 and 404, the pixel location (x, y) is initially set at x=0 and y=0. For this initial pixel (0, 0), a search is carried out to find the maximum value among array elements ContrastArray(0, 0, z). The z value corresponding to this maximum is defined as $Z_{max}$ and is then stored as array element 3DZ(0, 0) in step 405.

The intensity value corresponding to IntensityArray(0, 0, $Z_{max}$) is stored as array element 3DI(0, 0) in step 406. It is now time to move to the next pixel x=1 and y=0, or pixel (1, 0) in step 407. Test 408 is carried out to see if x is less than the image width. A positive answer will direct the flow back to steps 405 through 408. This loop will run its course until test 408 yields a negative answer. At that point 409, the y pixel number is incremented by 1. Test 410 is carried out to see if y is less than the image height. A positive answer will direct the flow back to steps 404 through 410. This loop will run its course until test 410 yields a negative answer. At that moment, array 3DZ(x, y) and array 3DI(x, y) are filled. The final step 411 involves taking the z value of 3DZ(x, y) and image intensity value 3DI(x, y) at every pixel location (x, y) and rendering them as a 3-D image.

Figure 5:
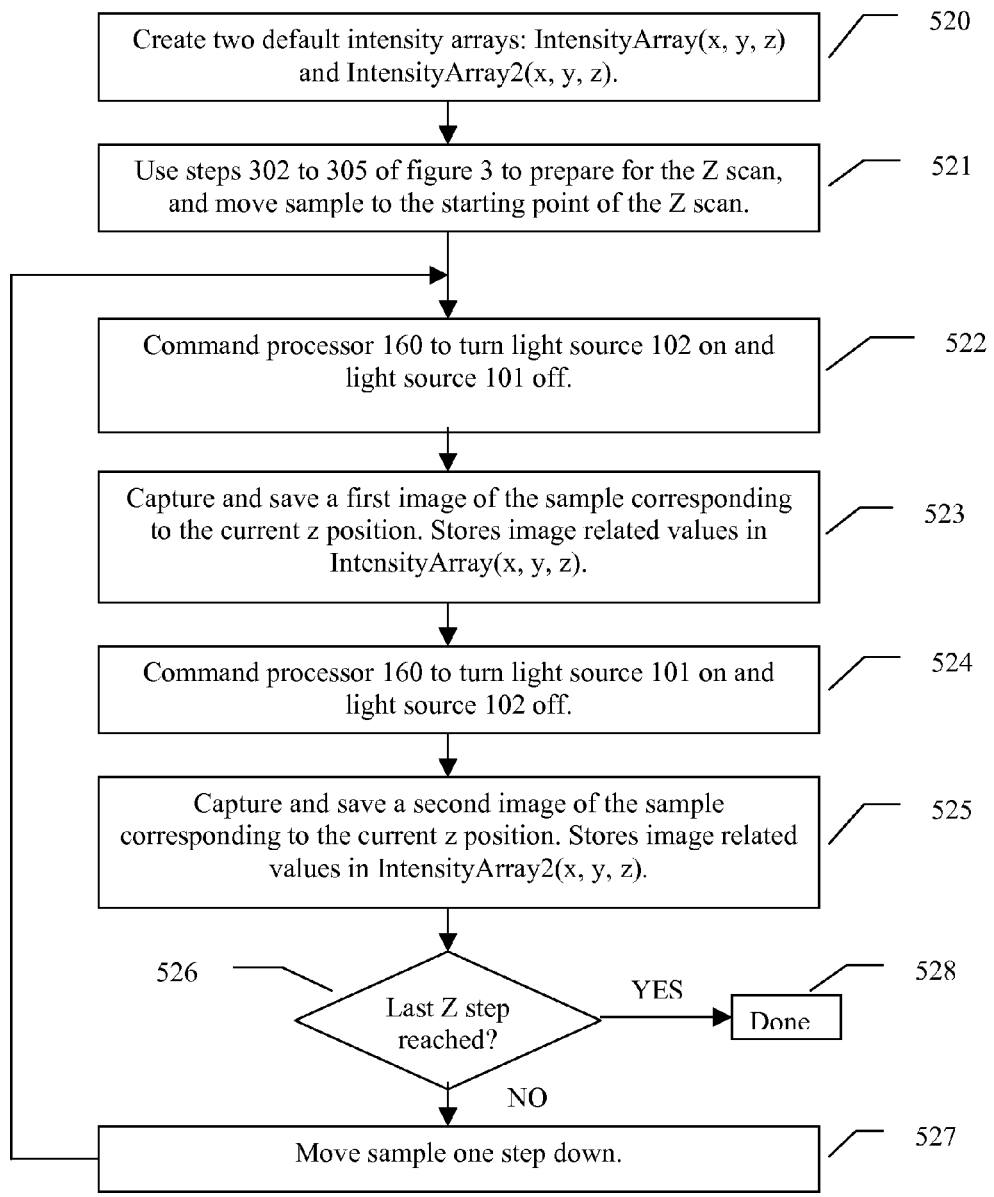
FIG. 5 is a flowchart illustrating Z scan and image acquisition process of the present invention.
Figure 6:
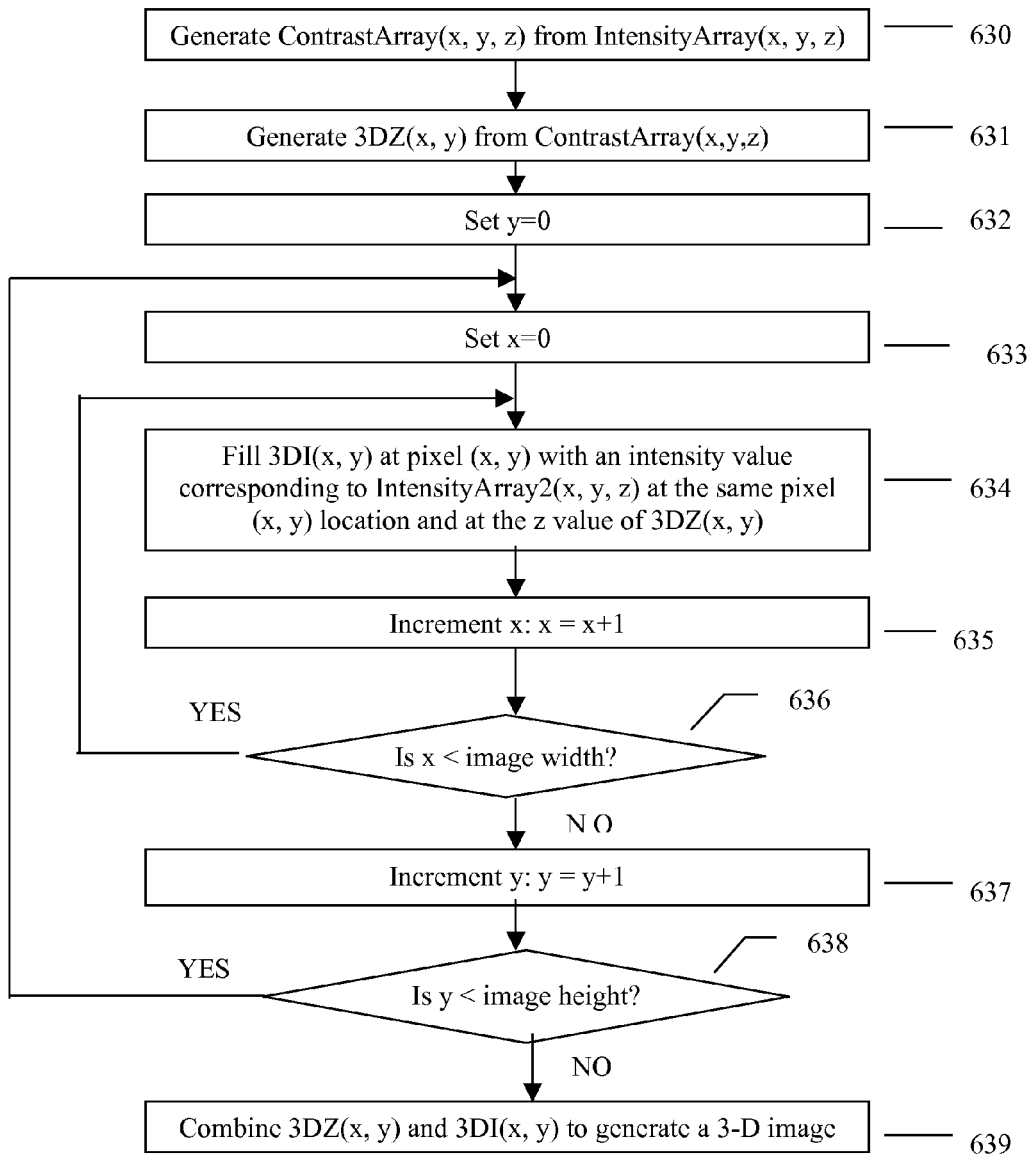
FIG. 6 is a flowchart illustrating a data analysis process to generate a 3-D image.

While contrast based 3-D image creation method, as described during the discussion of FIGS. 2 through 4, works for samples with a surface texture that produces high image contrast when in focus, it has difficulties with smooth samples with little contrast. Such an important limitation is unfortunately associated with Sieckmann in U.S. Appl. No. 2004/0257360A1. An improved 3-D image generation method of the present invention that overcomes this difficulty will now be described. Our method involves a one-pass image acquisition process and subsequent data analysis. FIG. 5 outlines the one-pass image acquisition process of the present invention. FIG. 6 illustrates a data analysis process to construct a 3-D image in according with the present invention.

In a one-pass image acquisition process of the present invention, the process begins at step 520 of FIG. 5 with the creation of two default arrays IntensityArray(x, y, z) and IntensityArray2(x, y, z). In step 521, preparation for the Z scan is carried out by following the steps of 302 through 305 in FIG. 3, and the sample is moved to the starting position of the Z scan. If the sample has little or no contrast, such as a polished clean bare silicon wafer, it is normally a challenge to know when the surface is in focus. In such a case, light source 102 of FIG. 1A can be turned on so that an image of the pattern on patterned article 104 is projected onto the focal plane of the objective lens to help the search for the top and bottom of the Z scan range. Whenever the pattern of patterned article 104 is in focus, we know that the flat sample is also in focus, and vice versa. For a sample with topography or depth profile, whenever a certain part of it, say region A, is in focus, the corresponding part of the pattern of patterned article 104 which overlaps with region A in the image field-of-view will also be in focus. In step 522, processor 160 turns light source 102 on and light source 101 off. As a result, an image of the pattern on patterned article 104 is projected onto the focal plane of the objective lens. In step 523, a first image of the sample at the current z position is captured and saved in IntensityArray(x,y,z). This image contains information from both the sample and the projected pattern. In step 524, processor 160 turns light source 101 on and light source 102 off, effectively erases the pattern. As a result, the focal plane of the objective lens now only contains information of the sample. In the mean time, processor 160 also adjusts the intensity of light source 101 automatically so that the average image intensity with or without the projected pattern's presence is the same. In step 525, a second image of the sample is captured and saved in IntensityArray2(x, y, z). In step 526, a test is carried out to see if the last Z scan step is reached. If not, the sample is moved down one step, in 527, and the process is directed back to step 522. This loop will run its course until the last Z scan step is reached. At that point, IntensityArray(x, y, z) is filled with image data from the first image set, and IntensityArray2(x, y, z) is filled with image data from the second image set.

FIG. 6 outlines a data analysis process involved in constructing a 3-D image according to the present invention. The process starts with 630, the creation of a high contrast array ContrastArray(x, y, z) from IntensityArray(x, y, z). Note that IntensityArray(x, y, z) and IntensityArray2(x, y, z) are fundamentally different; while the former is based on images containing information from both the sample and the patterned article, the latter is based on images containing information from the sample only. The next step, 631, is to generate a 3DZ(x, y) from ContrastArray(x, y, z) according the procedure of FIG. 4. In steps 632 and 633, the pixel location (x, y) is initially set at y=0 and x=0. For this initial pixel (0, 0), the value of 2-D array element 3DI(0, 0) is set equal to IntensityArray2(0, 0, z) in step 634, where z is the value of element 3DZ(0, 0). It is now time to move to the next pixel x=1 and y=0, or pixel (1, 0), in step 635. Test 636 is carried out to see if x is less than the image width. A positive answer will direct the flow back to steps 634 through 636. This loop will run its course until test 636 yields a negative answer. At that point 637, the y pixel number is incremented by 1. Test 638 is carried out to see if y is less than the image height. A positive answer will direct the flow back to steps 633 through 638. This loop will run its course until test 638 yields a negative answer. At that moment, array 3DI(x, y) are filled with image information from IntensityArray2(x, y, z). The final step 639 involves taking the z values of 3DZ(x, y) and image intensity or color values 3DI(x, y) at every pixel location (x, y) and rendering them as a 3-D image.

Those skilled in the art of computer programming and image processing will be familiar with techniques for improving the computational efficiency of the algorithm disclosed above. In particular, the use of parallel programming to speed up the process of image capturing, processing, and storage is within the scope of this invention.

It is worth pointing out that the z values of 3DZ(x, y) are based entirely on IntensityArray(x, y, z) while the image intensity or color values of 3DI(x, y) is generated with data only from IntensityArray2(x, y, z). In essence, for the one-pass image acquisition process of this invention, we are using the first image set to find a 3-D skeleton of the sample, and then filled the skeleton with image intensity or color data from the second image set. The most important difference between the 3-D creation method of the present invention and that of Sieckmann in U.S. Appl. No. 2004/0257360A1 lies in the fact that in generating a 3-D skeleton of a sample, we rely on the image contrast of a patterned article while Sieckmann relies on the image contrast of the sample itself. Therefore, the method of the present invention will work on samples with little or no image contrast while that of Sieckmann's won't.

Figure 7:
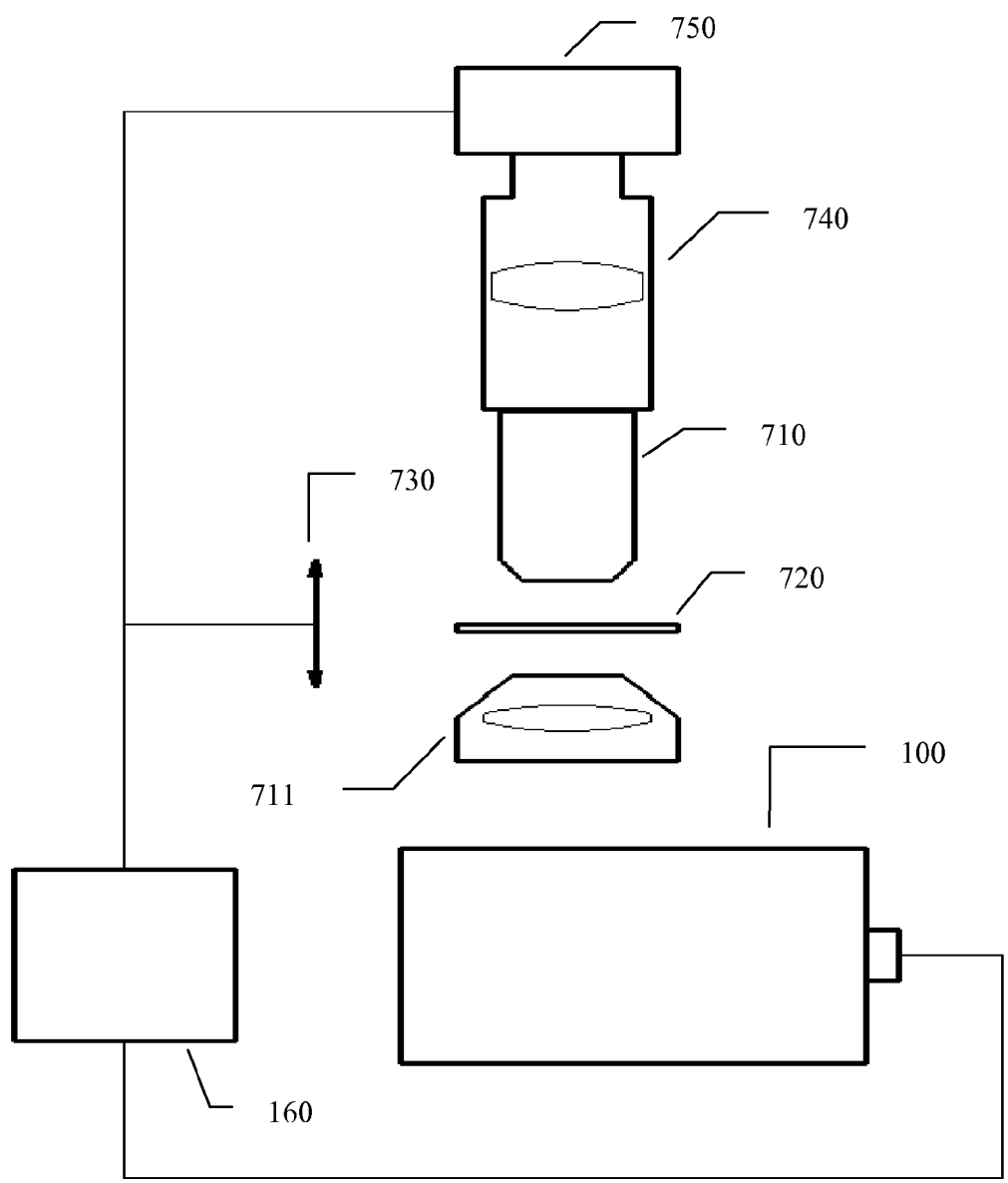
FIG. 7 is a block diagram illustrating a transmitted 3-D optical microscope of the present invention.

FIG. 7 is a diagram illustrating a transmitted 3-D optical microscope equipped with illuminator 100 in accordance with the present invention. In FIG. 7, illuminator 100 is shown in side view. To avoid confusion, the optical components inside illuminator 100 are not shown in FIG. 7. Whenever these components are mentioned, the reader is advised to reference FIG. 1A. A microscope operating in transmitted illumination mode is often used for studying transparent objects such as biology related samples. When operating in transmitted illumination mode, illuminator 100 is turned upside down so that its normal bottom opening is now pointing upwards. A condenser lens 711 is mounted directly above the normal bottom opening of illuminator 100. When light source 101 or light source 102 is on, lens group formed by lenses 105 and 106 projects an image of the light source onto the front aperture of condenser lens 711 ensuring uniform illumination on sample 720. When light source 102 is on, condenser 711 together with lens group formed by lenses 105 and 106 projects an image of the pattern on patterned article 104 onto the focal plane of objective lens 710.

Positioning means 730 is provided to change the relative position between sample 720 and objective lens 710. As a result, different features on the sample can be brought into focus of objective lens 710. As an option, a XY stage (not shown) can be incorporated into the microscope of FIG. 7 to move sample 720 around in a horizontal plane. Condenser lens 711 and sample 720 moves in tandem under the command of positioning means 730. In the preferred embodiment, positioning means 730 is a motorized Z stage. There are, of course, other ways to vary the relative position between sample 720 and objective lens 710. For example, objective lens 710 could be mounted on a piezoelectric actuator. In such an arrangement, the sample remains stationary while the objective lens moves up and down. It is understood by those skilled in the art that these variations are within the scope of this invention. Coupler 740 in conjunction with objective lens 710 yields an image of the sample on optical sensor 750. In the preferred embodiment, optical sensor 750 is either a CCD or a CMOS camera. Processor 160 is connected to the 3-D optical microscope of FIG. 7. Said processor is used to control positioning means 730, light sources 101 and 102, and optical sensor 750. In addition, said processor analyzes data and creates a 3-D image of a sample. In the preferred embodiment, said process is a personal computer.

Creating a 3-D image on the 3-D optical microscope of FIG. 7 involves just a single pass according to the present invention. During the process, positioning means 730 moves sample 720 from a pre-determined start position away from objective lens 710 through a set of pre-determined steps. At each step, processor 160 turns light source 102 on and light source 101 off. As a result, an image of the pattern on patterned article 104 is projected onto the focal plane of objective lens 710, optical sensor 750 captures and saves a first image of the sample; then processor 160 turns light source 101 on and light source 102 off, optical sensor 750 captures and saves a second image of the sample. This process repeats itself until all the steps have been taken. When done, processor 160 analyzes the first and second image set to create a 3-D image. The details of the single pass 3-D image creation process of the present invention has been discussed when we describe FIGS. 5 and 6 earlier.

Figure 8:
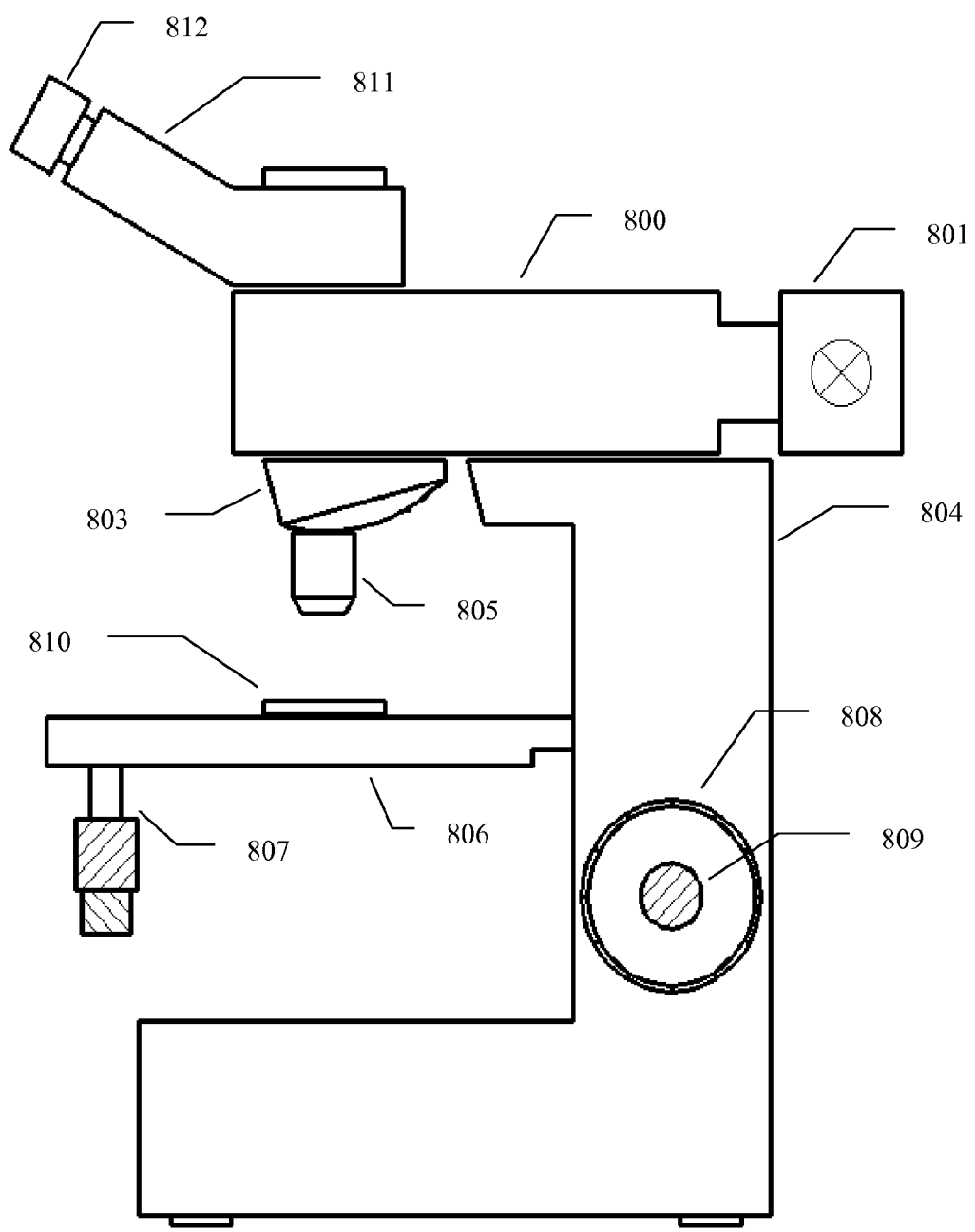
FIG. 8 is a diagram illustrating major components of a conventional optical microscope with a reflective illuminator.

FIG. 8 is a diagram illustrating a conventional optical microscope with a reflective illuminator. Light source 801 is attached onto illuminator 800. Objective turret 803, often with 4 to 6 mounting holes, is attached to microscope body 804. Objective lens 805 is threaded into one of the mounting holes of objective turret 803. Sample stage 806 can move in X and Y direction with turning knob 807 and move in vertical (Z) direction with focusing knobs 808 or 809. Focusing knob 808 can initiate large step moves in the Z direction and therefore is often called coarse focus knob. Focusing knob 809 performs small step moves in the Z direction and therefore is often called fine focus knob. Sample 810 is seated on sample stage 806. Trinocular tube 811 is attached to illuminator 800. Two identical eyepieces 812 slide into two of the three openings on the trinocular tube. An operator can view the sample through the eyepieces. The third opening on the trinocular tube is reserved for adding a camera which is optional for a conventional microscope.

Figure 9:
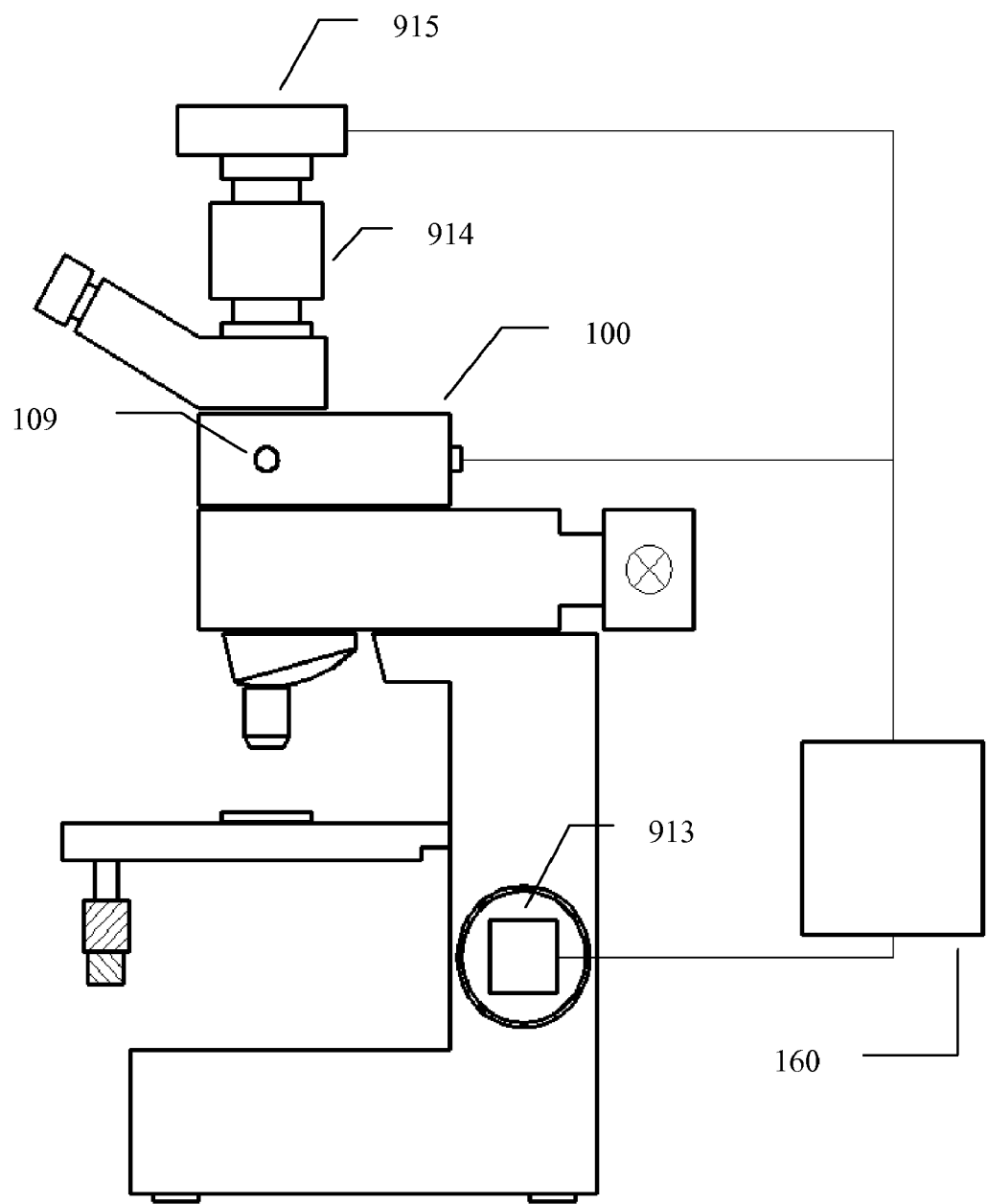
FIG. 9 is a diagram illustrating modifications made to the conventional optical microscope of FIG. 8 to turn it into a 3-D optical microscope in accordance with the present invention.

FIG. 9 illustrates modifications made to a conventional microscope of FIG. 8 in order to turn it into a 3-D optical microscope in accordance with the present invention. Illuminator 100 is mounted on top the regular microscope illuminator 800 of FIG. 8. Means for focusing adjustment 913 is implemented either on fine focus knob 809 or on objective turret 803 of FIG. 8. Some examples of means for focusing adjustment are electrical motor, piezoelectric actuator, and etc. In the preferred embodiment, means for focusing adjustment 913 is a motor coupled to fine focus knob 809 of FIG. 8. It is understood that other means of focusing adjustment is also within the scope of the present invention. Coupler 914 is mounted on trinocular tube 811 of FIG. 8 and camera 915 is attached to coupler 914. Pull level 109 is used to pull beam-splitter 107 out of the optical path of illuminator 100 when the microscope is operating in dark-field mode. Finally, processor 160 is connected to the modified microscope of FIG. 9. The processor is used to control means for focusing adjustment 913, camera 915, and light sources 101 and 102 of FIG. 1A. In addition, said processor analyzes data and creates a 3-D image of the sample. In the preferred embodiment, processor 160 is a personal computer.

Figure 10:
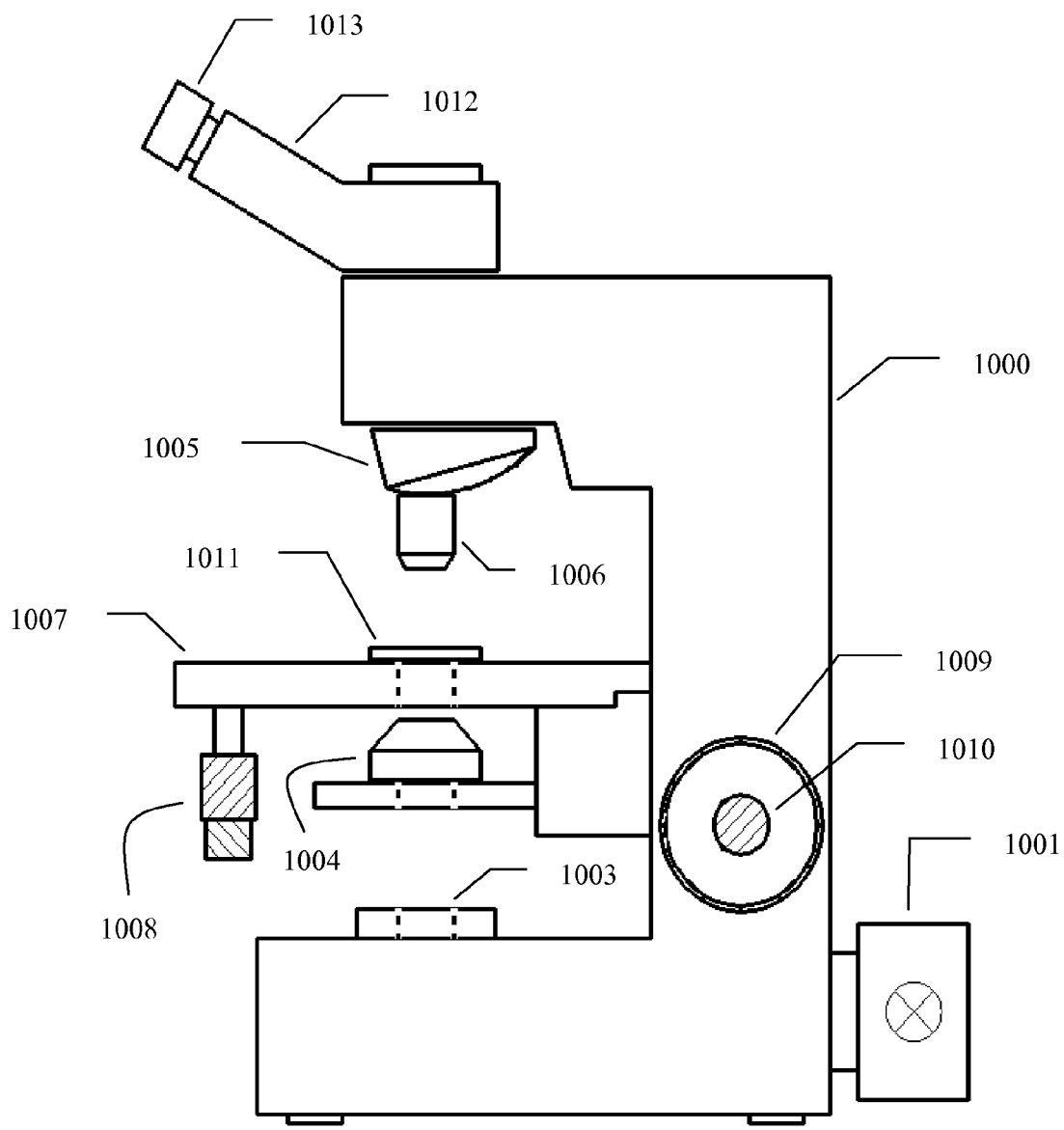
FIG. 10 is a diagram illustrating major components of a conventional optical microscope with a transmitted illuminator.

FIG. 10 is a diagram illustrating a conventional optical microscope with a transmitted illuminator. A substantial portion of the illuminator is hidden inside microscope body 1000. Some visible components of the illuminator typically include lens 1003 and condenser lens 1004. Light source 1001 is mounted to the entrance of the illuminator. Objective turret 1005, often with 4 to 6 mounting holes, is attached to microscope body 1000. Objective lens 1006 is threaded into one of the mounting holes of objective turret 1005. Sample stage 1007 can move in X and Y direction with turning knob 1008 and move in vertical (Z) direction with focusing knobs 1009 or 1010. Focusing knob 1009 can initiate large step moves in the Z direction and therefore is often called coarse focus knob. Focusing knob 1010 performs small step moves in the Z direction and therefore is often called fine focus knob. Sample 1011 is mounted on sample stage 1007. Condenser lens 1004 and sample stage 1007 travel in the Z direction together under the command of focusing knobs 1009 and 1010. Trinocular tube 1012 is attached to microscope body 1000. Two identical eyepieces 1013 slide into two of the three openings on the trinocular tube. An operator can view the sample through the eyepieces. The third opening on the trinocular tube is reserved for adding a camera which is optional for a conventional microscope.

Figure 11:
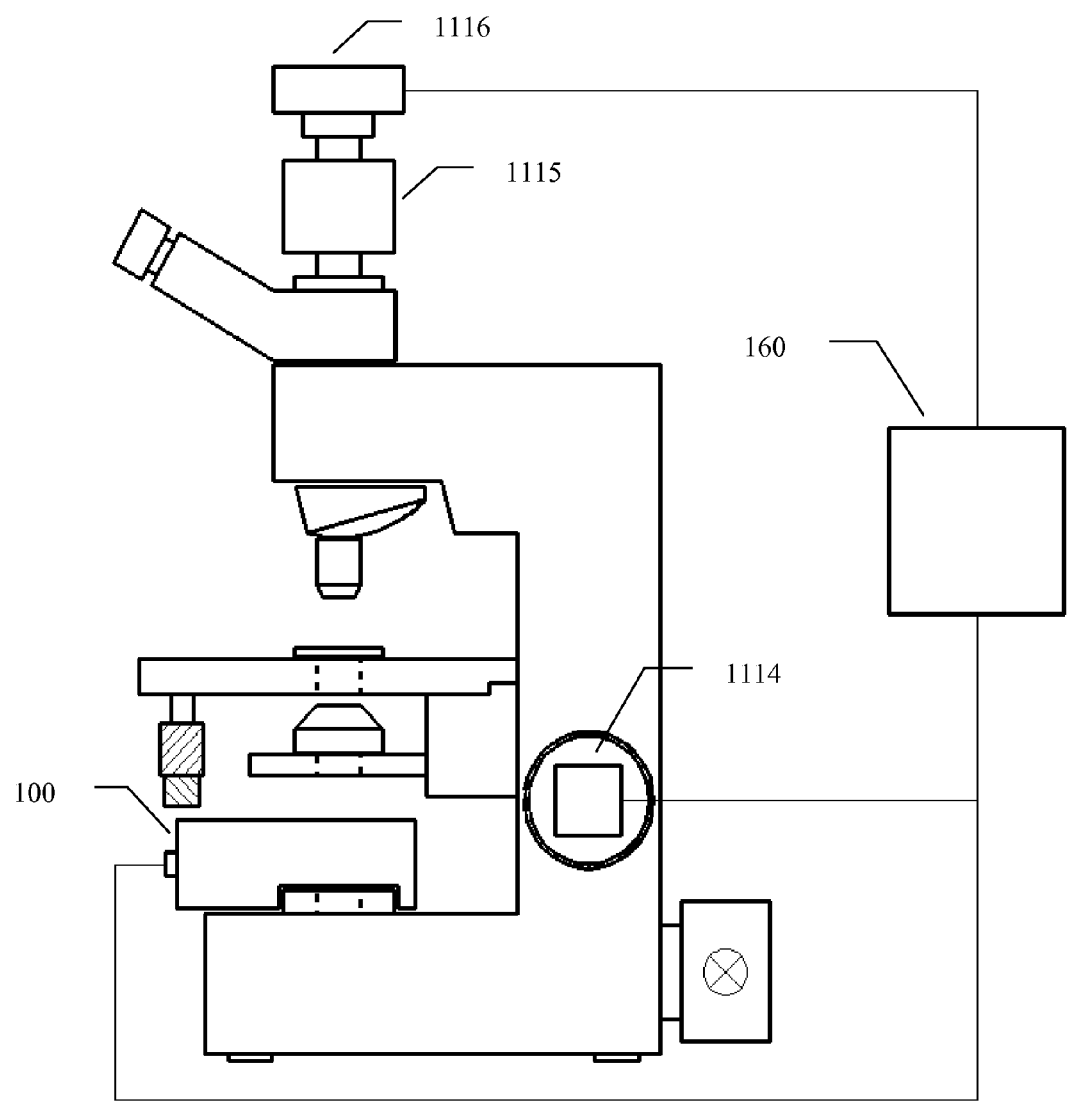
FIG. 11 is a diagram illustrating modifications made to the conventional optical microscope of FIG. 10 to turn it into a 3-D optical microscope in accordance with the present invention.

FIG. 11 illustrates modifications made to a conventional microscope of FIG. 10 in order to turn it into a 3-D optical microscope in accordance with the present invention. Illuminator 100 is mounted upside down on top of lens 1003 of FIG. 10. Means for focusing adjustment 1114 is implemented either on fine focus knob 1010 or on objective turret 1005 of FIG. 10. Some examples of means for focusing adjustment are electrical motor, piezoelectric actuator, and etc. In the preferred embodiment, means for focusing adjustment 1114 is a motor coupled to fine focus knob 1010 of FIG. 10. It is understood that other means of focusing adjustment is within the scope of the present invention. Coupler 1115 is mounted on trinocular tube 1012 of FIG. 10 and camera 1116 is attached to coupler 1115. Pull level 109 (not shown) is used to pull beam-splitter 107 out of the optical path of illuminator 100 when the microscope is operating in dark-field mode. Finally, processor 160 is connected to the modified microscope of FIG. 11. The processor is used to control means for focusing adjustment 1114, camera 1116, and light sources 101 and 102 of FIG. 1A. In addition, said processor analyzes data and creates a 3-D image of the sample. In the preferred embodiment, processor 160 is a personal computer.

Figure 12:
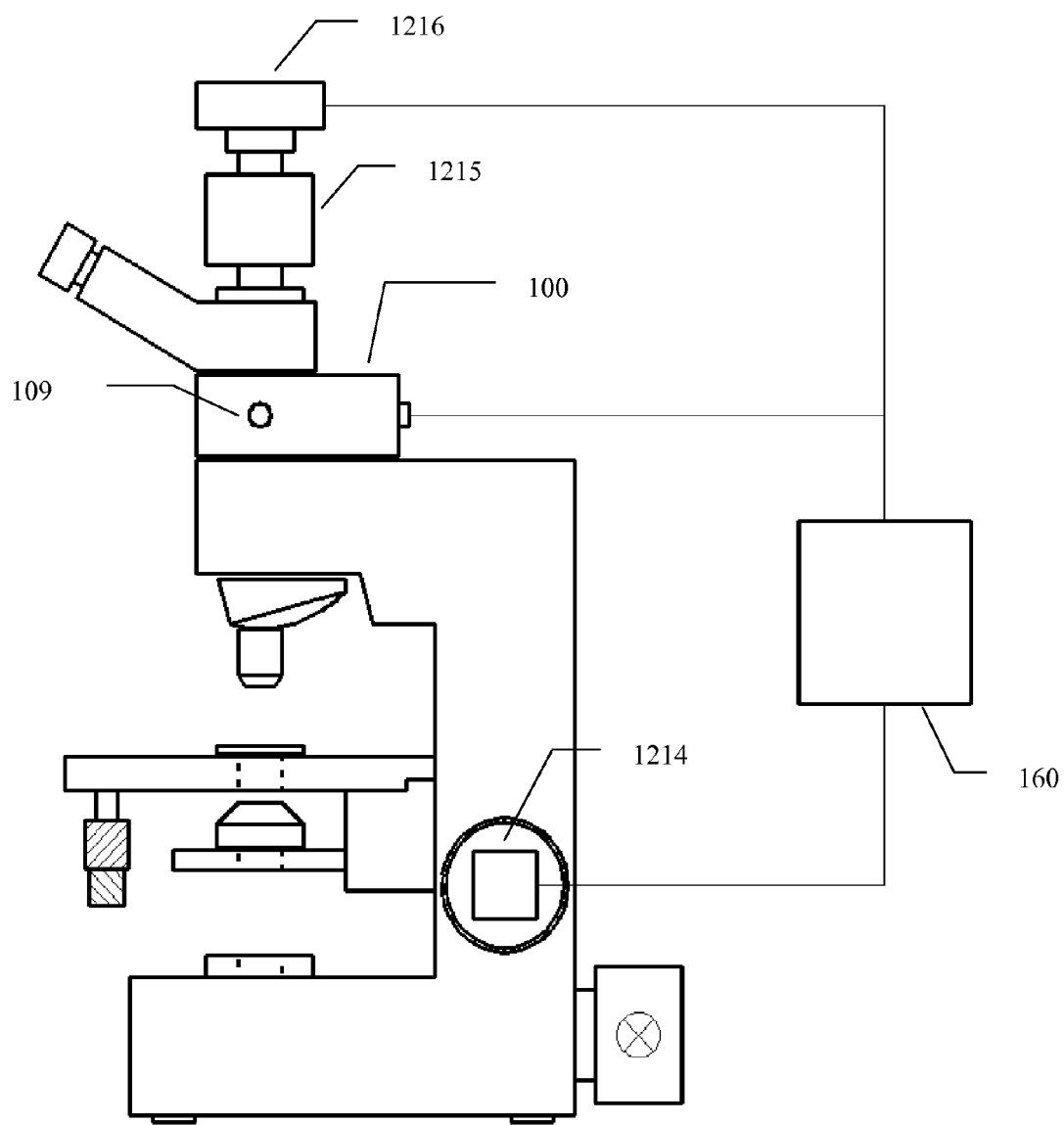
FIG. 12 is a diagram illustrating modifications made to the conventional optical microscope of FIG. 10 to turn it into a 3-D optical microscope in accordance with the present invention.

FIG. 12 illustrates modifications made to a conventional microscope of FIG. 10 in order to turn it into a 3-D optical microscope in accordance with the present invention. Illuminator 100 is added on the top frame of the conventional microscope of FIG. 10. Pull lever 109 is used to pull beam-splitter 107 of FIG. 1A out of the optical path of illuminator 100 when the microscope is operating in dark-field mode. Means for focusing adjustment 1214 is implemented either on fine focus knob 1010 or on objective turret 1005 of FIG. 10. Some examples of means for focusing adjustment are electrical motor, piezoelectric actuator, and etc. In the preferred embodiment, means for focusing adjustment is a motor coupled to fine focus knob 1010 of FIG. 10. It is understood that other means of focusing adjustment is within the scope of the present invention. Coupler 1215 is mounted on trinocular tube 1012 of FIG. 10 and camera 1216 is attached to coupler 1215. Finally, processor 160 is connected to the modified microscope of FIG. 10. The processor is used to control means for focusing adjustment 1214, camera 1216, and light sources 101 and 102 of FIG. 1A. In addition, said processor analyzes data and creates a 3-D image of the sample. In the preferred embodiment, processor 160 is a personal computer.

Operation principles of the 3-D microscopes shown in FIGS. 9 and 12 are similar to that of FIG. 1B while operation principles of the 3-D microscope shown in FIG. 11 are similar to that of FIG. 7. Since we have described the operation principles of the microscopes shown in FIG. 1B and FIG. 7, we will not repeat the same description here. The key point to remember is that in order to create a 3-D image using the microscopes of FIG. 1B, FIG. 7, FIG. 9, FIG. 11, and FIG. 12 in accordance with the present invention involves the aforementioned one-pass image acquisition process of FIG. 5 and subsequent data analysis process of FIG. 6.

The modifications of the microscopes of FIGS. 9, 11, and 12 in accordance with the present invention can be implemented easily and economically on almost all conventional optical microscopes as long as they have a fine focus knob. This is a big advantage over prior art related to confocal microscopy. A confocal microscope is relatively expensive to build. It is not easy and in many cases impossible to turn an existing optical microscope into a confocal microscope. With the present invention, however, an existing optical microscope can be easily turned into a 3-D optical microscope with just a few simple modifications.

We claim:

1. A microscope capable of generating three-dimensional (3-D) images, said microscope comprising:
   a first light source forming part of a first light path;
   a second light source and a patterned article forming part of a second light path;
   a shared set of components for said first and second light paths, said shared set of components including a first beam-splitter, a lens group, and a second beam-splitter connected in series, said first light source directing light onto said first beam-splitter and said second light source directing light via said patterned article onto said first beam-splitter, a patterned surface of said patterned article being located at an effective focal plane of said lens group, and said lens group imaging said first light source and said second light source at an entrance pupil of a microscope objective lens to simultaneously provide uniform illumination at a sample over an extended two-dimensional (2D) field; and
   a multi-pin connector linking electronically to said first light source and said second light source.

2. The microscope illuminator of claim 1, wherein said lens group includes a double-convex lens and an achromat doublet lens.

3. The microscope illuminator of claim 1, wherein said second beam-splitter is mounted on a one-dimensional linear slider linked to a pull lever.

4. The microscope illuminator of claim 1, wherein said patterned article is a piece of glass with a pattern formed on one of its surfaces.

5. The microscope illuminator of claim 1, wherein said first light source and said second light source are light emitting diodes (LEDs).

* * * * *